United States Patent [19]

Shane et al.

[11] 4,024,072
[45] May 17, 1977

[54] WATER-DISPERSIBLE DEFOAMER COMPOSITION

[75] Inventors: Hugh J. S. Shane, Guelph; Frederick S. Schell, Kitchener; Mohammad A. Kasem, Ottawa, all of Canada

[73] Assignee: Hart Chemical Limited, Guelph, Canada

[22] Filed: Feb. 18, 1976

[21] Appl. No.: 658,867

[30] Foreign Application Priority Data

Feb. 18, 1975 United Kingdom ............... 6808/75

[52] U.S. Cl. .............................. 252/358; 162/60; 252/321
[51] Int. Cl.$^2$ ......................... B01D 19/04
[58] Field of Search ............. 252/358, 321; 162/60

[56] References Cited

UNITED STATES PATENTS

| | | | |
|---|---|---|---|
| 2,643,240 | 6/1953 | Walton et al. | 252/358 |
| 2,648,645 | 8/1953 | Boris et al. | 252/358 |
| 2,748,086 | 5/1956 | Monson | 252/321 |
| 2,893,883 | 7/1959 | Stephan | 252/358 |
| 3,004,923 | 10/1961 | Jursich | 252/321 |
| 3,076,768 | 2/1963 | Boylan | 252/321 |
| 3,169,929 | 2/1965 | Nekervis et al. | 252/358 |
| 3,264,214 | 8/1966 | Stratton | 252/385 |
| 3,287,268 | 11/1966 | Tice | 252/358 |
| 3,329,625 | 7/1967 | Hoxie | 252/321 |
| 3,697,440 | 10/1972 | Lichtman et al. | 252/321 |
| 3,723,342 | 3/1973 | Shane et al. | 252/358 |
| 3,730,907 | 5/1973 | Shane et al. | 252/321 |

*Primary Examiner*—Richard E. Schafer
*Assistant Examiner*—Deborah L. Kyle

[57] ABSTRACT

Water-dispersible defoamer compositions comprise an intimate blend of a mixture of defoaming components and at least one emulsifier to impart water-dispersibility to the composition. The defoaming components include a monoester of an alkenylated succinic acid, a particular organo-phosphorus compound and a silicone oil. The defoamer compositions have particular use in pulp mill defoaming compositions.

19 Claims, No Drawings

WATER-DISPERSIBLE DEFOAMER COMPOSITION

FIELD OF INVENTION

The present invention relates to defoamer compositions for use in pulp mill and paper mill applications and to the preparation thereof.

BACKGROUND TO THE INVENTION

There are a number of factors to be considered in the formulation of a foam control material for use in controlling foam in pulp mill and paper mill operations and other operations, to eliminate or minimize the interference of foam in the particular operation. A foam control material should have the ability to decrease an already-formed foam to a low level in a short period of time and, additionally, the ability to prevent the formation of foam from the liquor once the material is present, over an extended period of time.

Foaming occurs in pulp and paper mills at a number of locations and many formulations have been suggested to control such foam, with the individual formulations being constructed for the particular location. Such locations include the brown stock washer wherein hot pulp is washed to remove entrained pulping liquor, the screen room wherein the washed pulp from the brown stock washer is subjected to displacement washing and cooling prior to passage to the bleach plant, and the paper making machine wherein the bleached pulp is formed into paper. In the first two locations, foaming occurs in alkaline medium, while, in the latter case, foaming occurs in an acid or neutral medium.

Almost universally the defoamer compositions have been provided in dispersed or dissolved form in an organic liquid carrier, typically a hydrocarbon oil, the carrier generally constituting in excess of 90% of the total composition. The use of such oils has been a convenient manner of application of the active defoaming chemicals but the presence of such oils in pulp mills has considerable drawbacks, including the formation of deposited pitch and water pollution. Additionally, the high proportion of carrier in the composition leads to the transportation of large volumes of defoamer product.

There has, therefore, long been sought a defoamer composition dispersible in water in place of mineral oil and which gives competitive performance characteristics. The present invention provides a water-dispersible defoamer composition which, in use, is substantially oil-free.

SUMMARY OF THE INVENTION

In accordance with the present invention, there is provided an intimately admixed defoamer composition comprising a mixture of defoaming components including a monoester, an organo-phosphorus compound and a silicone oil and at least one surfactant or emulsifier effective to impart water dispersibility to the defoamer composition. The present invention also provides a method of forming such defoaming composition.

GENERAL DESCRIPTION OF INVENTION

One of the defoaming components utilized in the composition of the present invention is a monoester formed from a monoalkenyl substituted succinic acid and a long chain alkanol.

The monoesters have the general formula:

$$R-CH-COOR'$$
$$|$$
$$CH_2-COOH$$

where R is at least one long chain linear or primary branched alkenyl group having a total of at least 12 carbon atoms and the formula:

$$R'' - CH = CH - CH_2 -$$

where R'' is a linear or primary branched chain alkyl group, and R' is a linear or primary branched chain alkyl group containing at least 12 carbon atoms.

The total number of carbon atoms in the R-group may vary over a wide range up to 30 or more carbon atoms. Mixtures of R-groups of different numbers of total carbon atoms are possible and included within the scope of the invention.

The total number of carbon atoms in the R'-group may also vary over a wide range up to 20 or more carbon atoms. Mixtures of alkyl groups of different numbers of carbon atoms are possible and within the scope of the invention. Mixtures of linear and primary branched chain alkyl groups also are possible.

The monoester may be formed by reacting a 1-olefin or mixture of 1-olefins with maleic anhydride to form the corresponding olefin-substituted succinic anhydride, and then monoesterifying the olefin-substituted succinic anhydride with the alkanol or mixture of alkanols.

One particular monoester which may be used in the present invention is formed by reacting 1-octadecene with maleic anhydride and monoesterifying the product with a mixture of linear alkanols containing from 16 to 20 carbon atoms in the chain.

A monoester, or a mixture of monoesters formed from a mixture of alcohols and/or a mixture of olefins, must be used in the composition of the invention and the esterification reaction is carried out under conditions which favor the formation of the monoester as compared with the diester. The diesters have been found to be less effective in defoaming pulp mill liquors although they may be present in minor quantities in the material resulting from the esterification reaction and hence in the defoaming composition.

Another defoamer component used in the composition of the invention is a silicone oil. The silicone oil may be a polysiloxane oil, such as, an alkyl, aryl, alicyclic or aralkyl siloxane or polysiloxane having a viscosity of from about 10 to about 3500 centistokes at 25° C. Preferred silicone oils are alkyl polysiloxanes including dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane and didodecyl polysiloxane.

Particular examples of commercially-available dimethyl polysiloxanes which may be used in the defoamer composition of the invention are Antifoam A, a thixotropic dimethyl polysiloxane, typically having a viscosity at 25° C of about 3100 to 3300 centistokes, and Dow Corning 200 Fluid, a dimethyl polysiloxane having a typical viscosity at 25° C of 50 centistokes.

A third defoamer component used in the composition of the invention is an organo-phosphorus compound which is n-tributylphosphate, n-tributoxyethylphosphate or triphenylphosphite, or mixtures thereof. It is important that the organo-phosphorus compound be selected from this group since other organo-phosphorus compounds tested were found to be ineffective, including tris(2-ethyl hexyl) phosphate, tris(2-ethyl hexyl) phosphite, tri-isooctyl phosphite, tridecylphosphite and trilauryl tri-thiophosphite.

The relative proportions of these three defoamer components may vary widely depending, inter alia, on the nature of the particular components used, the presence or absence of other defoamer components, and the nature, number and type of surfactants used in the composition.

In a defoamer composition according to the invention using the three components enumerated above, the organo-phosphorus compound constitutes from about 15 to about 65% by weight of the defoamer components, the monoester constitutes about 25 to about 60% by weight of the defoamer components, and the silicone oil constitutes from about 2 to about 20% by weight of the defoamer components.

In a particularly preferred defoamer composition of the invention, the defoamer components are constituted by the following materials in the relative weight proportions recited:

| | |
|---|---|
| Alfol 1620* octadecenyl succinate | 33.33% |
| Antifoam A | 13.33% |
| n-Tributylphosphate | 53.34% |

*Alfol 1620 is a mixture of alcohols containing from 16 to 20 carbon atoms in the chain and has typical properties as outlined in the following Table I, this analysis being provided by the manufacturer.

TABLE I

| | |
|---|---|
| Total alcohol, wt. % | 98.5 |
| Analysis (100% alcohol basis) | |
| $C_8H_{17}OH$ wt. % | 0.1 |
| $C_{10}H_{21}OH$ wt. % | 0.2 |
| $C_{12}H_{25}OH$ wt. % | 0.5 |
| $C_{14}H_{29}OH$ wt. % | 0.9 |
| $C_{16}H_{33}OH$ wt. % | 51.8 |
| $C_{18}H_{37}OH$ wt. % | 32.9 |
| $C_{20}H_{41}OH$ wt. % | 13.2 |
| $C_{22}H_{45}OH$ wt. % | 0.4 |
| Alcohol Color, APHA | 90 |
| Water, wt. % | 0.05 |
| Iodine Number | 1.32 |
| Hydroxyl Number | 206 |
| Saponification Number | <2.0 |

Other defoamer components also may be present in the defoamer composition of the invention to enhance its foam-inhibiting properties. For example, a copolymer of vinyl acetate and fumaric acid, which has been esterified with tallow alcohol, may be used as an additional defoaming component in this invention.

Where such a copolymer of vinyl acetate and fumaric acid esterified with tallow alcohol is to be used as an additional defoaming component, it generally is mixed with the other defoaming components as a 25% by weight solution thereof in paraffinic mineral oil.

The latter solution is available under the trade mark "PARATONE" 440 and has the following typical properties:

| | |
|---|---|
| Viscosity at 210° F (centistokes) | 1300 |
| Flash Point, COC ° F | 360 |
| Specific Gravity 60/60° F | 0.92 |

While the organic liquid in the Paratone 440 does introduce some liquid organic material to the defoaming composition, the composition nevertheless may be considered as substantially oil-free when compared with the prior art compositions mentioned above.

Thus, in the prior art compositions, mineral oil constitutes over 90% by weight of the composition whereas, in the present invention, even if the latter solution is added, the total quantity of oil introduced to the defoamer composition is minor. Assuming the maximum quantities for the defoamer components in the composition and the maximum quantity of additional defoaming component as specified hereinafter, the maximum weight percentage of mineral oil in the composition is 27% by weight, considerably less than the quantities used in prior art defoamer formulations.

While this quantity of oil may be considered to be large, it should be pointed out that this is the maximum quantity of oil present in the anhydrous defoamer composition. As is made clear below, the defoamer composition of the present invention is used as an aqueous dispersion thereof in which the predominant liquid phase is water. At a typical concentration of about 20% by weight solids in the dispersion, the maximum concentration of oil is less than 6% by weight. The latter quantity is almost negligable when compared with the greater than 90% by weight oil present in prior art defoamers in the form they are used.

In use, therefore, the defoamer compositions of the present invention are oil-free or substantially so.

When such additional defoamer component is included with the other three defoamer components in a defoamer composition according to the invention, then it may constitute up to about 45% of the total defoamer components. In a particularly preferred composition according to the invention, the defoamer components with relative weight proportions are provided as follows:

| | |
|---|---|
| Paratone 440 | 37.5% |
| Alfol 1620 Octadecenyl-succinate | 20.84% |
| Antifoam A | 8.33% |
| n-Tributylphosphate | 33.33% |

In the compositions of the invention, the silicone oil and the organo-phosphorus compound kill existing foam while the primary function of the monoester and additional defoaming component, if present, is to suppress foam formation over a long period of time.

The defoamer components enumerated above are formulated with one or more emulsifiers or surfactants to provide a water-dispersible defoamer composition in accordance with the invention. Usually a mixture of surfactants is used in order to provide a composition which is readily formed into an aqueous dispersion and which is utilizable in a variety of systems.

Surfactants of various types may be used in the compositions of the inventions, including anionic, cationic and non-ionic surfactants. Examples of suitable anionic surfactants are fatty acids containing from 12 to 22 carbon atoms and soaps of the fatty acids. Other suitable anionic surfactants include alkali metal and alkaline earth metal salts of alkyl-aryl sulfonic acids and sulfated or sulfonated oils.

Suitable cationic surfactants include salts of long chain primary, secondary or tertiary amines and quaternary salts.

Non-ionic surfactants also may be used and examples include alkoxylated alkyl substituted phenols, condensation products of higher fatty alcohols with ethylene oxide, condensation products of fatty acid amides with ethylene oxide, polyethylene glycol esters of long chain fatty acids, ethylene oxide condensates of polyhydric alcohol partial higher fatty acid esters and their inner anhydrides, long chain polyglycols in which one hydroxyl group is esterified with a higher fatty acid and the other hydroxyl group is etherified with a low molecular weight alcohol, and copolymers of ethylene oxide and propylene oxide. Additional non-ionic surfactants include sorbitans, "SPAN" (Trademark)'s, "TWEEN" (Trademark)'s, lecithin and ethoxylated lecithin.

One particular type of surfactant which can be used is a petroleum sulfonate of molecular weight from about 400 to about 600, such as calcium petroleum sulfonate. Calcium petroleum sulfonates are commercially-available, a typical such product being Surchem 306, typically having a molcular weight of about 440.

Another particular type of surfactant which may be used is an alkoxylated alkyl phenol of the formula:

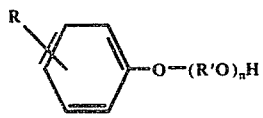

where R is an alkyl group, typically containing from 8 to 10 carbon atoms, particularly the n-nonyl group, usually located in the para position to the oxygen, R' is an alkyl group containing two or three carbon atoms, especially two carbon atoms, and n is a value from greater than 4 to less than about 8, preferably about 6.

As the alkoxylated alkyl substituted phenol, it is preferred to use an ethoxylated p-nonyl phenol containing about 6 ethylene oxide groups. This material may be designated:

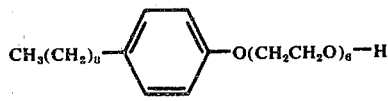

This product is available in commercial form, sold under the designation "REXOL" (Trademark) 25/6.

A further type of surfactant which may be used is an alkoxylated hydrogenated tallow amine, particularly an ethoxylated hydrogenated tallow amine. Materials of this type are commercially-available, typically as "DYESPERSE" (Trademark) 323B.

Copolymers of ethylene oxide and propylene oxide of various form may also be used as a surfactant in the compositions of the invention. Copolymers of this type are commercially available under the designation "PLURONIC" (Trademark)'s. The copolymer may be in the form of randomly-copolymerized chains, copolymerized blocks of polyethylene oxide and polypropylene oxide with varying chain lengths in the blocks and varying numbers of blocks and copolymerized blocks of polyethylene oxide or polypropylene oxide and blocks containing randomly connected propylene oxide and ethylene oxide units. A particular Pluronic which may be used is that known as Pluronic L62-D, which contains about 20% of ethylene oxide units.

The total quantity of surfactant or mixture of surfactants used in the composition of the invention may vary widely depending on the particular defoamer components used and the surfactant or surfactants used. Generally, the compositions of the invention are constituted about 20 to about 40% by weight of surfactant(s) and the balance by weight of defoamer components. Typically, about 30% by weight surfactant(s) and about 70% by weight defoamer components is used.

A preferred mixture of surfactants which may be used in the present invention is Pluronic L62-D, Rexol 25/6, Surchem 306 and Dyesperse 323B. The relative proportions of these individual surfactants may vary as required.

A particularly useful defoamer composition provided in accordance with this invention consists of:

|  | wt. % |
| --- | --- |
| Paratone 440 | 25.72 |
| Alfol 1620 octadecenylsuccinate | 14.29 |
| Antifoam A | 5.71 |
| n-Tributylphosphate | 22.86 |
| Pluronic L62-D | 14.29 |
| Rexol 25/6 | 5.71 |
| Surchem 306 | 5.71 |
| Dyesperse 323B | 5.71 |

A composition formulated in this way has been found to be a particularly effective defoamer composition which, on a weight basis, is much more effective than a conventional oil-based defoamer composition.

The above-described particularly preferred composition may also contain about 2 to 3% by weight of the above composition of sodium carboxymethylcellulose, which tends to improve the water-dispersibility of the product.

The compositions of the invention are effective defoamer compositions in pulp mill applications, more particularly in black liquor defoaming. The blended composition of defoamer components and surfactants is applied to the black liquor in conventional manner, typically as an aqueous dispersion of discrete particles thereof formed by agitation of the composition in water. The dispersion may contain a wide range of quantities of solid, typically about 15 to 20%, and a wide range of particle sizes, such as about 0.1 to 2 microns.

Alternatively, the anhydrous composition may be dispersed directly into the black liquor requiring to be defoamed, typically by removing part of the black liquor from the main stream, dispersing the required amount of defoamer in the removed black liquor and recycling the resulting dispersion to the main black liquor stream.

The dispersion of the defoamer compositions into the removed black liquor stream also may be combined with black liquor characteristics monitoring, such as temperature, specific gravity and conductance determinations.

Thus, the anhydrous defoamer composition of the invention is delivered to the pulp mill for feed into the black liquor, either directly or after initial formation into an aqueous dispersion.

Since the particularly preferred composition outlined above is considerably more effective on a pound-for-pound basis than the conventional oil-based defoamers, the bulk of defoamer composition required to be transported and handled is considerably less in the case of the present invention than conventional oil-based defoamers to provide comparable defoaming.

In comparative tests with one such oil-based defoamer, the particularly preferred composition outlined above exhibits as good defoaming properties, comparable defoaming reproducibility, better drainage, excellent batch reproducibility and comparable substantivity.

The defoamer compositions of the present invention represent a major improvement in the art in that the necessity for large volumes of oil carrier in pulp mill defoamer compositions with consequent problems within the mill, is eliminated and yet effective defoamer compositions are provided.

The defoamer compositions of the invention are prepared by intimately blending the defoamer components with the detergent(s). The intimate blend may be formed by high shear mixing or homogenization under pressure.

The present invention provides a particular procedure for forming the intimate blend of the components which is particularly effective. The method involves shock cooling molten monoester at a high temperature by spraying water onto the molten monoester followed by blending with the other components.

EXAMPLES

The invention is illustrated by the following Examples:

EXAMPLE 1

This Example illustrates the formation of Alfol 1620 octadecenylsuccinate monoester.

2250 parts by weight of 1-octadecene was charged to a clean and dry kettle and was heated with agitation to about 60° C. When about 60° C was reached, 800 parts by weight of meleic anhydride was charged to the kettle and the mixture then heated to about 185° C and maintained thereat for about 8 to 10 hours or more until the end point is determined by a technique such as gel permeation chromatography.

The product then was cooled to about 120° C and 2170 parts by weight of premelted Alfol 1620 was added and the mixture was heated at 120° C for 20 minutes or more until the ester had an acid value of about 64 to 70 mg KOH per gram. When the ester possessed this acid value, it was cooled to about 50° C to provide 5150 parts by weight of an amber liquid which solidified on further cooling to 25° C.

EXAMPLE 2

This Example illustrates the formation of an anhydrous defoaming composition according to the invention.

Paratone 440 and Pluronic L62-D were heated with stirring to about 145° C to 150° C to give a homogeneous mass. To the homogeneous mass was slowly added melted Alfol 1620 octadecenylsuccinate produced by the procedure outlined in Example 1 and to give a homogeneous mixture.

Batchwise addition of cold water in a total amount of 5.7% by weight of the composition to the homogeneous mixture at 140° to 145° C causes a volume increase with bubble formation and the temperature to drop to about 110° to 120° C. The mass was reheated to about 140° C and a second batch of water was added and the process repeated until all the required water was added. At the end of the water addition, the spongy mass was heated to 140° to 145° C and maintained thereat for 1 to 2 minutes to drive off all the water.

The liquid mass was cooled to 100° to 110° C and Antifoam A and tributylphosphate were added and the mixture was stirred while being heated to 120° C. Rexol 25/6, Surchem 306, Dyesperse 323B and sodium carboxymethylcellulose were added and the entire mass was heated with stirring to about 120° C. and held at that temperature for about 2 minutes. The resulting blend was cooled with stirring to room temperature (about 24° C) to provide a cooled uniform, homogeneous and stable blend of normally incompatible ingredients.

The quantities of components used were sufficient to provide a final blend containing the following composition:

|  | wt. % |
| --- | --- |
| Paratone 440 | 25.00 |
| Alfol 1620 octadecenylsuccinate | 13.89 |
| Antifoam A | 5.56 |
| n-Tributylphosphate | 22.22 |
| Pluronic L62-D | 13.89 |
| Rexol 25/6 | 5.56 |
| Surchem 306 | 5.56 |
| Dyesperse 323B | 5.56 |
| Sodium carboxymethylcellulose | 2.78 |

This composition was found to have a specific gravity (at 24° C) of 0.98 and a pour point of 6° C. The composition is a waxy solid at $-20°$ to 0° C, has a viscosity of 10,000 cps at 13° C and 6,000 cps at 24° C and is an amber liquid of viscosity about 2,800 cps at 40° C. The composition readily formed a fine particulate dispersion in water in which the particle size ranged from about 0.2 to about 1.2 microns.

EXAMPLE 3

This Example illustrates the effectiveness of the defoamer composition of Example 2 is brown stock washer defoaming.

An experimental foam property testing apparatus was set up. The apparatus consisted of a 4 ½-gallon (20 liters) battery jar full of water, immersed in which was a thermostatically-controlled immersion heater, a thermometer, an agitator and a cylindrical glassware holding vessel for black liquor. For evaluation of compositions the black liquor was recycled through a small gear pump from the bottom back to the top of the holding vessel, re-entering the vessel through a small spray nozzle. Certain standard parameters were chosen, including a recycle pump rate of 2320 mls/min and a standard black liquor charge of 500 ccs of 180° F. (82° C)

In making tests of defoaming characteristics, the water bath was heated to about 180° F (82° C) and maintained at this temperature throughout. The 500 ccs of black liquor to be treated, also heated to 180° F (82° C) were poured into the holding vessel and the recycle pump was started. As the black liquor recycled through the system, a head of foam was formed in the holding vessel.

As soon as the foam height reached 3 inches (7.6 cm), defoamer composition was syringed into the recycle stream. The effect of the addition on the foam was observed by taking foam height readings every 5 seconds for the first 35 seconds, every 10 seconds up to 60 seconds and then every 20 seconds.

An aqueous dispersion was prepared containing 18% of the anhydrous composition prepared as outlined in Example 2 and the balance water and 0.03 ml of this dispersion was used in the defoaming test on a black liquor. Using the same black liquor, a comparative test of defoaming properties was carried out using 0.03 ml of a particularly effective typical oil-based defoamer composition (O.D.). The results are reproduced in the following Table II:

TABLE II

| Time (secs.) | Example 1 | Foam Height (Inches) (cms) O.D. | No Defoamer |
| --- | --- | --- | --- |
| 0 | 3 (7.6) | 3 (7.6) | 3 (7.6) |
| 5 | 2.8 (7.1) | 2.5 (6.4) | 3.8 (9.7) |
| 10 | 1.5 (3.8) | 1.8 (4.6) | 4.1 (10.4) |
| 15 | 1.3 (3.3) | 1.5 (3.8) | 4.4 (11.2) |
| 20 | 1.2 (3.1) | 1.4 (3.6) | 4.8 (12.2) |
| 25 | 1.5 (3.8) | 1.5 (3.8) | 5.1 (13.0) |
| 30 | 1.5 (3.8) | 1.5 (3.8) | 5.5 (14.0) |
| 35 | 1.5 (3.8) | 1.5 (3.8) | 6 (15.2) |
| 40 | 1.6 (4.1) | 1.5 (3.8) | 6.3 (16.0) |
| 50 | 1.6 (4.1) | 1.6 (4.1) | 7 (17.8) |
| 60 | 1.8 (4.6) | 1.8 (4.6) | |
| 80 | 1.9 (4.8) | 1.8 (4.6) | |
| 100 | 2.0 (5.1) | 2.1 (5.3) | |
| 120 | 2.0 (5.1) | 2.3 (5.8) | |
| 140 | 2.1 (5.3) | 2.6 (6.6) | |
| 160 | 2.1 (5.3) | 2.9 (7.4) | |
| 180 | 2.1 (5.3) | 3.3 (8.4) | |
| 200 | 2.1 (5.3) | 3.7 (9.4) | |
| 220 | 2.1 (5.3) | 4.2 (10.7) | |
| 240 | 2.1 (5.3) | 4.6 (11.7) | |

The above results indicate that the composition of the invention, which contains 5.5 times less active defoamer (based on the anhydrous composition) than the oil-based composition, produces a marginally better foam kill and a longer-sustained defoaming activity on the black liquor tested.

EXAMPLE 4

This Example illustrates the drainage properties of pulp treated using the composition of EXAMPLE 2.

An aqueous dispersion of the product of Example 2 containing 18% by weight dispersed solids was tested for drainage properties and compared with the typical oil-based defoamer composition (O.D.) referred to in Example 3 using the following procedure.

A 25 inch column of 1.5 inches (3.8 cms) inside diameter was provided with a screen fitted to the end to hold pulp mat and black liquor. The column was surrounded by a hot water jacket with circulating water having a temperature of 85° C.

Pulp stock was separated into a pulp dry fraction and a black liquor fraction. 300 mls of the black liquor fraction were heated to 85° C with rapid agitation and the defoamer requiring testing was added to the black liquor and the temperature and stirring were maintained for 60 seconds.

The liquor then was poured over a mat of the pulp in the column and allowed to settle for 60 seconds. The drain for the column then was opened and timing commenced. When the 250 mls had drained from the column, the timing was stopped.

The following Table III reproduces the results obtained:

TABLE III

| Wt. of Pulp (g) | Defoamer | Drainage Time (secs) |
| --- | --- | --- |
| 2 | None | 30 |
|  | O.D. | 26 |
|  | Example 2 | 25 |
| 3 | None | 52 |
|  | O.D. | 41 |
|  | Example 2 | 31 |
| 4 | None | 67 |
|  | O.D. | 66 |
|  | Example 1 | 53 |

The results of the above Table III show the improved drainage properties of the product of Example 2 as compared with the oil-based defoamer (O.D.)

EXAMPLE 5

This Example illustrates the substantivity properties of the product of Example 2.

An aqueous dispersion of the product of Example 2 containing 18% by weight dispersed solids was tested for substantivity properties and compared with the typical oil-based defoamer composition (O.D.) referred to in Example 3, using 0.05 mls of defoamer using the following procedure.

A 1000 ml sample of black liquor containing pulp was heated to 180° F (82° C) and then split into two identical 500 ml samples. One of the samples was filtered to provide solid and filtrate. Defoamer was added to the other sample and, after mixing thoroughly, the liquor was filtered.

The pulp pad containing no defoamer was mixed with filtrate containing defoamer and the pad containing defoamer was mixed with the filtrate which contain no defoamer.

The samples were added successively to a 2-liter cylinder and air was bubbled through the material in the cylinder. The foam height was measured every 10 seconds for 1 minute and then every 30 seconds for an additional minute.

This substantivity test was designed not only to show the antifoaming properties of the sample but also to illustrate the performance of the composition tested on a multistage washer.

The results obtained are reproduced in the following Table IV:

TABLE IV

| | Portion A (Pulp containing defoamer) Foam Height (in) (cms) Defoamer | | | Portion B (Black liquor containing defoamer) Foam Height (in) (cms) Defoamer | | |
| --- | --- | --- | --- | --- | --- | --- |
| Time (secs) | None | Example 2 | O.D. | None | Example 2 | O.D. |
| 0 | 0 | — | — | 0 | — | — |
| 10 | 0.8 (2.0) | 0.4 (1.0) | 0.4 (1.0) | 0.8 (2.0) | 0.6 (1.5) | 0.2 (0.5) |
| 20 | 1.6 (4.1) | 0.6 (1.5) | 0.5 (1.3) | 1.6 (4.1) | 1.0 (2.5) | 0.5 (1.3) |
| 30 | 2.4 (6.1) | 1.1 (2.8) | 0.7 (1.8) | 2.4 (6.1) | 1.1 (2.8) | 1.0 (2.5) |
| 40 | 2.8 (7.1) | 1.3 (3.3) | 1.1 (2.8) | 2.8 (7.1) | 1.6 (4.1) | 1.3 (3.3) |
| 50 | 3.1 (7.9) | 1.6 (4.1) | 1.2 (3.1) | 3.1 (7.9) | 2.0 (5.1) | 1.5 (3.8) |
| 60 | 3.5 (8.9) | 2.1 (5.3) | 1.4 (3.6) | 3.5 (8.9) | 2.3 (5.8) | 2.0 (5.1) |
| 90 | 4.4 (11.2) | 3.2 (8.1) | 2.4 (6.1) | 4.4 (11.2) | 3.2 (8.1) | 2.6 (6.6) |
| 120 | 5.4 (13.7) | 4 (10.2) | 3.5 (8.9) | 5.4 (13.7) | 4.3 (10.9) | 3.5 (8.9) |

The results of the above Table IV show the comparative substantivity properties of the composition of Example 2 as compared with the typical oil-based defoamer (O.D.).

EXAMPLE 6

This Example illustrates the defoaming properties of compositions produced as outlined in Example 2 with variations in the monoester utilized.

A series of alkanol monoesters of alkenyl-substituted succinic acid were prepared and tested for effectiveness in defoamer formulations having the same quantities of components as described in Example 2. The defoamer test procedure used was that outlined in Example 3 using 0.1 ml of an 18% by weight aqueous dispersion.

The alkanol monoesters were prepared in each case by a procedure which involved reacting 1 mole of maleic anhydride with 1.1 moles of α-olefin under a nitrogen atmosphere at 190° to 210° C for 8 hours followed by cooling to 90° C. 1 mole of alkanol heated to 90° C was added to the alkenyl succinic anhydride at 90° C and the mixture was stirred for 30 minutes at 90° C followed by cooling with agitation to 50° C before cooling to ambient temperature.

The anhydrous defoaming composition in each case was prepared by heating Paratone 440 and Pluronic L62-D with agitation to 150° C before adding melted succinate thereto. The succinate was mixed well with the other components while heating to 150° C. Water (5% by weight of the total composition) was added all at once and the mixture agitated vigorously, during which period the temperature dropped to 110° to 120° C and the volumn of the mass increased two-fold by frothing. The spongy mass was beaten with agitation, heated at 140° C for 2 minutes to complete removal of water, cooled to 110° C and Antifoam A and tributyl-phosphate were added and mixed while heated to 120° C. The resulting mixture was cooled to 100° C, Dyesperse 323B, Rexol 25/6, Surchem 306 and NaCMC were added in that order, heated to 110° C and well mixed with agitation for 5 minutes and cooled to 30° C.

The following Table V sets forth the compounds tested:

TABLE V

| Compound No. | Alcohol | Olefin | |
|---|---|---|---|
| 1 | Lauryl | Dodecene-1 | |
| 2 | Lauryl | Octadecene-1 | |
| 3 | Lauryl | $C_{18}$ to $C_{24}$-ene | (1) |
| 4 | Lauryl | $C_{18}$ to $C_{28}$-ene | (2) |
| 5 | Lauryl | $C_{20}$ to $C_{24}$-ene | (3) |
| 6 | Lauryl | $C_{24}$ to $C_{28}$-ene | (4) |
| 7 | Lauryl | $C_{30}$+-ene | (5) |
| 8 | Alfol 1620 | Dodecene-1 | |
| 9 | Alfol 1620 | $C_{18}$ to $C_{24}$-ene | (1) |
| 10 | Alfol 1620 | $C_{18}$ to $C_{28}$-ene | (2) |
| 11 | Alfol 1620 | $C_{20}$ to $C_{24}$-ene | (3) |
| 12 | Alfol 1620 | $C_{24}$ to $C_{28}$-ene | (4) |
| 13 | Alfol 1620 | $C_{30}$+-ene | (5) |
| 14 | Epal 20+ (6) | Dodecene-1 | |
| 15 | Epal 20+ | Octadecene-1 | |
| 16 | Epal 20+ | $C_{18}$ to $C_{24}$-ene | (1) |
| 17 | Epal 20+ | $C_{18}$ to $C_{28}$-ene | (2) |
| 18 | Epal 20+ | $C_{20}$ to $C_{24}$-ene | (3) |
| 19 | Epal 20+ | $C_{24}$ to $C_{28}$-ene | (4) |
| 20 | Epal 20+ | $C_{30}$+-ene | (5) |

Notes:
(1) $C_{18}$ to $C_{24}$-ene (Ethyl Corporation) The following specification was supplied by the manufacturer:

| | wt. % |
|---|---|
| $C_{16}$ and lighter olefins | 1.3 |
| $C_{18}$ olefins | 3.2 |
| $C_{20}$ olefins | 55.3 |
| $C_{22}$ olefins | 29.1 |
| $C_{24}$ olefins | 9.5 |
| $C_{26}$ and higher olefins | 0.3 |
| Total olefins | 98.5 |
| Total paraffins | 1.5 |
| Colour, APHA | 60 |
| OH content, wt. % | 0.29 |

TABLE V-continued

| | |
|---|---|
| $I_2$ value | 75.5 |
| Mole %-linear α-olefins | 39.8 |
| -linear internal olefins | 15.0 |
| -branched olefins | 45.2 |

(2) $C_{18}$ to $C_{28}$-ene (Ethyl Corporation) The following specification was supplied by the manufacturer:

| | wt. % |
|---|---|
| $C_{14}$ olefin | 0.3 |
| $C_{16}$ olefin | 0.3 |
| $C_{18}$ olefin | 4.8 |
| $C_{20}$ olefin | 51.2 |
| $C_{22}$ olefin | 32.2 |
| $C_{24}$ olefin | 9.7 |
| $C_{26}$ olefin | 1.5 |
| Total olefins | 97.46 |
| Total paraffins | 2.54 |
| Colour, APHA | 60 |
| OH content, wt. % | 0.37 |
| $I_2$ value | 69 |
| Mole %-linear α-olefins | 34.9 |
| -linear internal olefins | 19.9 |
| -branched olefins | 45.2 |

(3) $C_{20}$ to $C_{24}$-ene (α-olefin fraction) (Gulf Oil Corporation) The following specification was supplied by the manufacturer:

| Carbon No. wt. % | Typical value |
|---|---|
| $C_{18}$ | 1 |
| $C_{20}$ | 49 |
| $C_{22}$ | 42 |
| $C_{24}$ | 8 |
| $C_{26}$ | <0.1 |
| Specific gravity at 60° F (18° C) | 0.799 |
| Viscosity SUS at 210° F (100° C) | 33.2 |
| Melting Point ° C | 34 |
| Haze Point ° C | 30 |
| Flash Point (COC) ° C | 190 |
| Saybolt Colour | +30 |

(4) $C_{24}$ to $C_{28}$-ene (α-olefin fraction) (Gulf Oil Corporation) The following specification was supplied by the manufacturer:

| Carbon No. wt. % | Typical value |
|---|---|
| $C_{22}$ | 0.3 |
| $C_{24}$ | 28 |
| $C_{26}$ | 44 |
| $C_{28}$ | 20 |
| $C_{30}$+ | 8 |
| Specific Gravity at 60° F (18° C) | 0.819 |
| Viscosity SUS at 210° F (100° C) | 34.5 |
| Melting Point ° C | 46 |
| Haze Point ° C | 66 |
| Flash Point (COC) ° C | 194 |
| Saybolt Colour | +15 |

(5) $C_{30}$+-ene (α-olefin fraction) (Gulf Oil Corporation) The following specification was supplied by the manufacturer:

| Carbon No. wt. % | Typical value |
|---|---|
| $C_{28}$ and lower | 22 |
| $C_{30}$ and higher | 78 |
| Saybolt Colour | +2 |
| Viscosity SUS at 210° F (100° C) | 52.4 |
| Flash Point (COC) ° C | 265 |
| Melting Point ° C | 72 |

(6) Epal 20+ (Ethyl Corporation) The following specification was supplied by the manufacturer:

| Component | wt. % |
|---|---|
| $C_{18}OH$ | 4 |
| $C_{20}OH$ | 20 |
| $C_{22}OH$ | 13 |
| $C_{24}OH$ | 10 |
| $C_{26}OH$ | 8 |
| $C_{28}OH$ | 5 |
| $C_{30}OH$ | 3 |
| $C_{32}OH$ and higher | 3 |
| Total normal and branched alcohols | 66 |
| Normal alcohols | 33 |
| Branched alcohols | 33 |
| Hydrocarbons ($C_{24}$ to $C_{40}$) | 34 |
| Total | 100 |

Typical Chemical Analysis

| | |
|---|---|
| Hydroxyl value, mgKOH/g | 105 |
| Acid Value, mgKOH/g | 0.1 |
| Ester value, mgKOH/g | 2 |
| Iodine value, $CgI_2/g$ | 6 |
| Carbonyl oxygen, wt. % C | 0.1 |

Typical Physical Properties

| | |
|---|---|
| Congealing point, ° C. | 48 |
| Colour, APHA | 300 |
| Colour, Gardner | 3.5 |

TABLE V-continued

| Appearance | off-white, waxy solid |
|---|---|
| Flash Point (COC) °C | >200 |

The defoamer test results obtained with the various defoamers are reproduced in the following Table VI:

TABLE VI

| Time (secs) | Compound Number — Foam Height (inches) (cm) | | | | | | | | | |
|---|---|---|---|---|---|---|---|---|---|---|
| | 1 | 2 | 3 | 4 | 5 | 6 | 7 | 8 | 9 | 10 |
| 0 | 3.0 (7.6) | 3.0 (7.6) | 3.0 (7.6) | 3.0 (7.6) | 3.0 (7.6) | 3.0 (7.6) | 3.0 (7.6) | 3.0 (7.6) | 3.0 (7.6) | 3.0 (7.6) |
| 5 | 2.5 (6.4) | 2.7 (6.9) | 3.1 (7.9) | 2.75(7.0) 3.2 (8.1) | 3.3 (8.4) | 2.6 (6.6) | 1.7 (4.3) | 3.2 (8.1) | 3.0 (7.6) | |
| 10 | 1.0 (2.5) | 1.1 (2.8) | 1.75(4.4) | 2.25(5.7) | 2.6 (6.6) | 2.45(6.2) | 1.05(2.7) | 0.4 (1.0) | 2.6 (6.6) | 2.3 (5.8) |
| 15 | 1.0 (2.5) | 0.65(1.7) | 0.7 (1.8) | 1.05(2.7) | 1.45(3.7) | 1.65(4.2) | 0.45(1.1) | 0.35(0.9) | 2.0 (5.1) | 1.5 (3.8) |
| 20 | 0.7 (1.8) | 1.0 (2.5) | 0.7 (1.8) | 0.55(1.4) | 1.0 (2.5) | 1.35(3.4) | 0.3 (0.8) | 0.35(0.9) | 1.6 (4.1) | 1.15(2.9) |
| 25 | 0.7 (1.8) | 1.2 (3.0) | 1.0 (2.5) | 0.4 (1.0) | 0.7 (1.8) | 1.1 (2.8) | 0.45(1.1) | 0.35(0.9) | 1.65(4.2) | 1.25(3.2) |
| 30 | 0.65(1.7) | 1.3 (3.3) | 1.15(2.9) | 0.3 (0.8) | 0.75(1.9) | 1.5 (3.8) | 0.6 (1.5) | 0.4 (1.0) | 1.65(4.2) | 1.4 (3.6) |
| 35 | 1.0 (2.5) | 1.45(3.7) | 1.2 (3.1) | 0.3 (0.8) | 1.05(2.7) | 1.6 (4.1) | 0.75(1.9) | 0.45(1.1) | 1.65(4.2) | 1.45(3.7) |
| 40 | 1.1 (2.8) | 1.7 (4.3) | 1.4 (3.6) | 0.3 (0.8) | 1.05(2.7) | 1.55(3.9) | 1.15(2.9) | 0.45(1.1) | 1.75(4.4) | 1.45(3.7) |
| 50 | 1.25(3.2) | 2.2 (5.6) | 1.6 (4.1) | 0.5 (1.3) | 1.15(2.9 | 1.55(3.9) | 1.15(2.9) | 0.55(1.4) | 2.0 (5.1) | 1.5 (3.8) |
| 60 | 1.45(3.7) | 2.4 (6.1) | 2.1 (5.3) | 0.65(1.7) | 1.25(3.2) | 1.7 (4.3) | 1.4 (3.6) | 0.65(1.7) | 2.15(5.5) | 1.7 (4.3) |
| 80 | 1.35(3.4) | 2.4 (6.1) | 2.2 (5.6) | 1.0 (2.5) | 1.55(2.9) | 2.1 (5.3) | 1.5 (3.8) | 1.15(2.9) | 2.1 (5.4) | 2.05(5.2) |
| 100 | 1.45(3.7) | 2.4 (6.1) | 2.35(6.0) | 1.15(2.9) | 1.7 (4.3) | 1.75(4.4) | 2.15(5.5) | 1.2 (3.0) | 2.15(5.5) 2.0 (5.1) | |
| 120 | 1.55(3.9) | 2.5 (6.4) | 2.25(5.7) | 1.05(2.7) | 2.1 (5.3) | 1.6 (4.1) | 2.05(5.2) | 1.2 (3.0) | 2.15(5.5) | 2.0 (5.1) |
| 140 | 1.7 (4.3) | 2.45(6.2) | 2.1 (5.3) | 1.10(2.8) | 2.1 (5.3) | 1.7 (4.3) | 2.15(5.5) | 1.35(3.4) | 2.15(5.5) | 2.0 (5.1) |
| 160 | 1.65(4.2) | 2.3 (5.8) | 2.2 (5.6) | 1.25(3.2) | 2.15(5.4) | 2.2 (5.6) | 2.0 (5.1) | 1.5 (3.8) | 2.1 (5.4) | 2.0 (5.1) |
| 180 | 1.25(3.2) | 2.4 (6.1) | 2.2 (5.6) | 1.4 (3.6) | 2.1 (5.3) | 2.3 (5.8) | 2.1 (5.3) | 1.6 (4.1) | 2.2 (5.6) | 2.0 (5.1) |
| 200 | 1.4 (3.6) | 2.35(6.0) | 2.2 (5.6) | 1.35(3.4) | 2.1 (5.3) | 2.3 (5.8) | 1.75(4.4) | 1.65(4.2) | 2.2 (5.6) | 2.0 (5.1) |
| 220 | 1.6 (4.1) | 2.25(5.7) | 2.4 (6.1) | 1.35(3.4) | 1.7 (4.3) | 2.4 (6.1) | 2.15(5.5) | 1.65(4.2) | 2.15(5.5) | 2.1 (5.4) |
| 240 | 2.0 (5.1) | 2.25(5.7) | 2.4 (6.1) | 1.45(3.7) | 2.1 (5.3) | 2.25(5.7) | 2.2 (5.6) | 1.7 (4.3) | 2.1 (5.4) | 2.1 (5.4) |
| | 11 | 12 | 13 | 14 | 15 | 16 | 17 | 18 | 19 | 20 |
| 0 | 3.0 (7.6) | 3.0 (7.6) | 3.0 (7.6) | 3.0 (7.6) | 3.0 (7.6) | 3.0 (7.6) | 3.0 (7.6) | 3.0 (7.6) | 3.0 (7.6) | 3.0 (7.6) |
| 5 | 3.1 (7.9) | 3.5 (8.9) | 3.25(8.3) | 3.0 (7.6) | 2.4 (6.1) | 2.5 (6.4) | 1.4 (3.6) | 2.6 (6.6) | 3.0 (7.6) | 2.3 (5.8) |
| 10 | 2.6 (6.6) | 3.5 (8.9) | 3.2 (8.2) | 1.6 (4.1) | 1.4 (3.6) | 1.2 (3.0) | 0.2 (0.5) | 1.4 (3.6) | 3.0 (7.6) | 1.6 (4.1) |
| 15 | 1.65(4.2) | 2.4 (6.1) | 2.55(6.5) | 0.3 (0.8) | 1.2 (3.1) | 0.3 (0.8) | 0.3 (0.8) | 1.2 (3.0) | 2.0 (5.1) | 0.7 (1.8) |
| 20 | 0.75(1.9) | 2.0 (5.1) | 2.3 (5.8) | 0.4 (1.0) | 1.1 (2.8) | 0.45(1.1) | 0.4 (1.0) | 0.5 (1.3) | 1.3 (3.3) | 0.75(1.9) |
| 25 | 0.7 (1.8) | 1.5 (3.8) | 2.0 (5.1) | 0.55(1.4) | 1.0 (2.5) | 0.55(1.4) | 0.4 (1.0) | 0.5 (1.3) | 1.2 (3.0) | 0.7 (1.8) |
| 30 | 0.75(1.9) | 1.45(3.7) | 2.05(5.2) | 0.7 (1.8) | 1.0 (2.5) | 0.7 (1.8) | 0.4 (1.0) | 0.5 (1.3) | 1.1 (2.8) | 0.55(1.4) |
| 35 | 1.3 (3.3) | 1.6 (4.1) | 2.05(5.2) | 1.0 (2.5) | 1.1 (2.8) | 0.75(1.9) | 0.3 (0.8) | 0.5 (1.3) | 1.0 (2.5) | 0.7 (1.8) |
| 40 | 1.55(3.9) | 1.55(4.0) | 2.05(5.2) | 1.05(2.6) | 1.1 (2.8) | 0.75(1.9) | 0.6 (1.5) | 0.55(1.4) | 1.05(2.6) | 0.75(1.9) |
| 50 | 1.3 (3.3) | 1.75(4.4) | 2.0 (5.1) | 1.0 (2.5) | 1.15(2.9) | 1.05(2.7) | 0.6 (1.5) | 0.6 (1.5) | 0.7 (1.8) | 0.6 (1.5) |
| 60 | 1.3 (3.3) | 2.1 (5.3) | 1.75(4.4) | 1.0 (2.5) | 1.2 (3.0) | 1.05(2.7) | 0.6 (1.5) | 0.6 (1.5) | 1.0 (2.5) | 0.75(1.9) |
| 80 | 1.4 (3.6) | 2.0 (5.1) | 2.0 (5.1) | 0.7 (1.8) | 1.3 (3.3) | 0.65(1.7) | 0.7 (1.8) | 0.65(1.6) | 1.15(2.9) | 1.1 (2.8) |
| 100 | 1.75(4.4) | 2.05(5.4) | 1.7 (4.3) | 0.7 (1.8) | 1.4 (3.6) | 1.1 (2.8) | 0.75(1.9) | 0.6 (1.5) | 1.3 (3.3) | 1.1 (2.8) |
| 120 | 1.4 (3.6) | 2.2 (5.6) | 1.75(4.4) | 1.15(2.9) | 1.4 (3.6) | 1.15(2.9) | 1.0 (2.5) | 0.65(1.6) | 1.35(3.4) | 1.2 (3.0) |
| 140 | 1.5 (3.8) | 2.2 (5.6) | 1.7 (4.3) | 1.1 (2.8) | 1.55(3.9) | 0.7 (1.8) | 1.0 (2.5) | 0.65(1.6) | 1.2 (3.0) | 1.3 (3.3) |
| 160 | 1.45(3.7) | 2.1 (5.3) | 2.3 (5.8) | 1.2 (3.0) | 1.4 (3.6) | 0.65(1.6) | 1.05(2.6) | 0.75(1.9) | 1.1 (2.8) | 1.35(3.4) |
| 180 | 1.35(3.4) | 2.25(5.7) | 2.25(5.7) | 1.4 (3.6) | 1.35(3.4) | 0.6 (1.5) | 0.6 (1.5) | 0.4 (1.0) | 1.3 (3.3) | 1.35(3.4) |
| 200 | 1.4 (3.6) | 2.15(5.5) | 2.3 (5.8) | 1.4 (3.6) | 1.6 (4.1) | 0.55(1.4) | 1.0 (2.5) | 0.7 (1.8) | 1.3 (3.3) | 1.3 (3.3) |
| 220 | 1.55(3.9) | 2.3 (5.8) | 2.4 (6.1) | 1.4 (3.6) | 1.4 (3.6) | 0.7 (1.8) | 0.6 (1.5) | 1.05(2.7) | 1.2 (3.0) | 1.25(3.2) |
| 240 | 1.55(3.9) | 2.25(5.7) | 2.4 (6.1) | 1.4 (3.6) | 1.4 (3.6) | 1.2 (3.0) | 1.0 (2.5) | 1.1 (2.8) | 1.6 (4.1) | 1.25(3.2) |

The results of the above Table VI demonstrate the effectiveness to a greater or lesser degree of the defoamer formulations in providing foam kill and sustained control of foaming over an extended period.

EXAMPLE 7

This Example illustrates the defoaming effectiveness of a composition omitting Paratone 440.

A defoamer composition (A) was prepared using the procedure outlined in Example 6 with an additional quantity of succinate substituting for the Paratone 440. Another defoamer composition (B) was prepared in which Acryloid 953, an acrylate, was substituted for the Paratone 440.

The defoaming properties of 0.1 mls of an 18% by weight aqueous dispersion of these compositions were tested using the procedure of Example 3 and the results are reproduced in the following Table VII:

TABLE VII

| Time (secs) | Foam Height (inches) (cms) | |
|---|---|---|
| | A | B |
| 0 | 3.0 (7.6) | 3.0 (7.6) |
| 5 | 2.7 (6.9) | 3.2 (8.1) |
| 10 | 2.4 (6.1) | 3.35 (8.5) |
| 15 | 1.75 (4.4) | 3.2 (8.1) |
| 20 | 1.5 (3.8) | 2.6 (6.6) |
| 25 | 1.55 (3.9) | 2.6 (6.6) |
| 30 | 1.65 (4.2) | 2.7 (6.9) |
| 35 | 1.75 (4.4) | 3.0 (7.6) |
| 40 | 2.05 (5.2) | 2.65 (6.7) |
| 50 | 2.1 (5.3) | 3.2 (8.1) |
| 60 | 2.35 (6.0) | 3.4 (8.6) |
| 80 | 2.55 (6.5) | 3.55 (9.0) |
| 100 | 2.75 (7.0) | 3.55 (9.0) |
| 120 | 3.1 (7.6) | 4.1 (10.4) |
| 140 | 3.45 (8.8) | 4.65 (11.8) |
| 160 | 3.55 (9.0) | 5.35 (13.6) |
| 180 | 3.7 (9.4) | 5.5 (14.0) |
| 200 | 4.0 (10.0) | 6.4 (16.3) |
| 220 | 4.2 (10.7) | 6.6 (16.8) |
| 240 | 4.5 (11.4) | 7.0 (17.8) |

The results of the above Table VII show that an effective defoaming composition (A) can be provided which omits Paratone 440 although there is a loss of effectiveness in sustaining the defoaming effect. The results also show that Acryloid 953 has an adverse effect on the defoaming properties of the composition.

EXAMPLE 8

This Example illustrates the effect of the presence of various organo-phosphorus compounds in the defoaming compositions.

A series of defoamer formulations were prepared following the procedure outlined in Example 6, using differing organo-phosphorus compounds in place of the tributylphosphate. The organo-phosphorus compounds tested were: tributoxyethylphosphate (TBEP), triphenyl phosphite (TPP), tris(2-ethyl hexyl) phosphate (TEHPA), tris(2-ethyl hexyl) phosphite (TEHP), triisooctyl phosphite (TIOP), tridecyl phosphite (TDP) and trilauryl trithio-phosphite (TLTP). Each composition was tested for defoaming effectiveness using 0.1 ml of an 18% by weight aqueous dispersion in the procedure of Example 3 and compared with the composition containing tributylphosphate (TBP). The results are reproduced in the following Table VIII:

TABLE VIII

| Time (secs) | Foam Height (inches) (cms) Organo-Phosphorus Compound | | | | | | | |
|---|---|---|---|---|---|---|---|---|
| | TBP | TBEP | TPP | TEHPA* | TEHP | TIOP | TDP | TLTP |
| 0 | 3.0 (7.6) | 3.0 (7.6) | 3.0 (7.6) | 3.0(7.6) | 3.0 (7.6) | 3.0 (7.6) | 3.0 (7.6) | 3.0 (7.6) |
| 5 | 2.6 (6.6) | 1.45(3.7) | 2.4 (6.1) | 3.2(8.1) | 4.0(10.1) | 3.6 (9.1) | 3.4 (8.6) | 3.55(9.0) |
| 10 | 2.1 (5.3) | 0.6 (1.5) | 2.45(6.2) | 3.4(8.6) | 4.0(10.1) | 3.65(9.3) | 3.4 (8.6) | 3.6 (9.1) |
| 15 | 1.45(3.7) | 0.65(1.7) | 1.25(3.2) | 3.5(8.9) | 3.75(9.5) | 3.6 (9.1) | 3.05(7.7) | 3.6 (9.1) |
| 20 | 1.4 (3.6) | 1.0 (2.5) | 1.2 (3.1) | 3.2(8.1) | 3.7 (9.4) | 3.2 (8.1) | 2.4 (6.1) | 3.5 (8.9) |
| 25 | 1.35(4.2) | 1.15(2.9) | 0.45(1.1) | 3.2(8.1) | 3.2 (8.1) | 2.7 (6.9) | 2.15(5.5) | 3.4 (8.6) |
| 30 | 1.4 (3.6) | 1.25(3.2) | 0.4 (1.0) | 3.0(7.6) | 3.15(8.0) | 2.45(6.2) | 1.65(4.2) | 3.35(8.5) |
| 35 | 1.5 (3.8) | 1.4 (3.6) | 0.6 (1.5) | 3.0(7.6) | 3.1 (7.9) | 2.35(6.0) | 1.55(3.9) | 3.4 (8.6) |
| 40 | 1.6 (4.1) | 1.45(3.7) | 0.7 (1.8) | 3.1(7.9) | 3.0 (7.6) | 2.1 (5.3) | 1.6 (4.1) | 3.25(8.3) |
| 50 | 1.75(4.4) | 1.7 (4.3) | 1.05(2.7) | 3.2(8.1) | 2.7 (6.9) | 2.25(5.7) | 1.75(4.4) | 3.4 (8.6) |
| 60 | 2.1 (5.3) | 1.7 (4.3) | 1.4 (3.6) | 3.4(8.6) | 2.5 (6.4) | 2.4 (6.1) | 2.1 (5.3) | 3.3 (8.4) |
| 80 | 2.1 (5.3) | 2.0 (5.1) | 1.6 (4.0) | 3.1(7.9) | 2.25(5.7) | 2.1 (5.3) | 2.15(5.5) | 3.0 (7.6) |
| 100 | 2.1 (5.3) | 1.55(3.9) | 1.55(3.9) | 3.3(8.4) | 2.45(6.2) | 2.55(6.5) | 2.15(5.5) | 2.75(7.0) |
| 120 | 2.1 (5.3) | 1.5 (3.8) | 1.55(3.9) | 3.3 (8.4) | 2.25(5.7) | 2.5 (6.4) | 2.4 (6.1) | 2.6 (6.6) |
| 140 | 2.2 (5.6) | 1.55(3.9) | 1.6 (4.0) | 3.2 (8.1) | 2.15(5.5) | 2.5 (6.4) | 2.5 (6.4) | 2.3 (5.8) |
| 160 | 2.1 (5.3) | 1.6 (4.0) | 1.7 (4.3) | 3.3 (8.4) | 2.3 (5.8) | 2.35(6.0) | 2.5 (6.4) | 2.4 (6.1) |
| 180 | 2.1 (5.3) | 1.55(3.9) | 2.0 (5.1) | 3.4 (8.6) | 2.3 (5.8) | 2.4 (6.1) | 2.5 (6.4) | 2.5 (6.4) |
| 200 | 1.7 (4.3) | 1.4 (3.6) | 2.15(5.5) | 3.6 (9.1) | 2.1 (5.3) | 2.3 (5.8) | 2.4 (6.1) | 2.45(6.2) |
| 220 | 2.1 (5.3) | 1.5 (3.8) | 2.2 (5.6) | 4.0(10.1) | 2.2 (5.6) | 2.45(6.2) | 2.45(6.2) | 2.45(6.2) |
| 240 | 2.0 (5.1) | 1.7 (4.3) | 2.0 (5.1) | 3.6 (9.1) | 2.3 (5.8) | 2.45(6.2) | 2.4 (6.1) | 2.45(6.2) |

*These results determined with 0.03 ml of defoamer dispersion

The results of the above Table VIII indicate that it is only certain organo-phosphorus compounds which are effective in producing good kill and long-sustained defoaming action.

SUMMARY

The present invention, therefore, provides a novel and substantially effective defoamer composition which may be readily formed into an aqueous dispersion for pulp mill defoaming applications. Modifications are possible within the scope of the invention.

We claim:
1. An intimately admixed defoamer composition, comprising:
   a. a mixture of active defoamer components consisting of:
      i. from about 25 to about 60% by weight of a monoester of the formula:

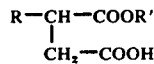

wherein R is at least one long chain alkenyl group havng a total of at least 12 carbon atoms and the formula:

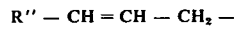

where R" is a linear or primary branched chain alkyl group, and R' is at least one alkyl group containing at least 12 carbon atoms,
   ii. from about 15 to about 65% by weight of an organo-phosphorus compound selected from the group consisting of n-tributylphosphate, n-tributoxyethylphosphate and triphenyl phosphite,
   iii. from about 2 to about 20% by weight of a silicon oil,
   iv. from 0 up to about 45% by weight of the other active defoamer components of a 25% by weight solution of a copolymer of vinyl acetate and fumaric acid which has been esterified with tallow alcohol in a hydrocarbon mineral oil, and
   b. at least one surfactant effective to impart water dispersibility to said defoamer composition.

2. The composition of claim 1, consisting of about 20 to about 40% by weight of said at least one surfactant and the balance by weight of said mixture of defoamer components.

3. The composition of claim 1, wherein R contains up to about 30 carbon atoms.

4. The composition of claim 1, wherein R is a mixture of alkenyl groups containing from 12 to about 30 carbon atoms.

5. The composition of claim 1, wherein R' contains up to about 20 carbon atoms.

6. The composition of claim 1, wherein R' is a mixture of alkyl groups containing from 12 to about 20 carbon atoms.

7. The composition of claim 1, wherein said silicone oil is a dimethyl polysiloxane.

8. The composition of claim 1, wherein said at least one surfactant is a mixture of surfactants.

9. The composition of claim 8 wherein said mixture of surfactants includes as its components a calcium petroleum sulfonate of molecular weight of about 400 to about 600, an alkoxylated alkyl phenol of the formula:

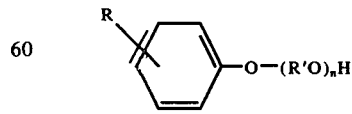

where R is an alkyl group containing 8 to 10 carbon atoms, R' is an alkyl group containing 2 or 3 carbon atoms and n is a value greater than 4 to less than about 8, an alkoxylated hydrogenated tallow amine and a copolymer of ethylene oxide and propylene oxide.

10. The composition of claim 9, wherein said calcium petroleum sulfonate is one having a molecular weight of about 440, the alkoxylated alkyl phenol is an ethoxylated p-nonyl phenol containing about 6 ethylene oxide groups, the alkoxylated hydrogenated tallow amine is an alkoxylated hydrogenated tallow amine, and the copolymer of ethylene oxide and propylene oxide contains about 20% of ethylene oxide units.

11. The composition of claim 10 further including sodium carboxy-methylcellulose.

12. The defoamer composition of claim 1 dispersed as discrete particles in an aqueous medium.

13. The defoamer composition of claim 12 wherein said aqueous medium is water.

14. The defoamer composition of claim 12 wherein said aqueous medium is pulp mill black liquor.

15. The defoamer composition of claim 12 wherein the dispersion contains about 15 to about 20% by weight of said particles.

16. The defoamer composition of claim 15 wherein said particles have an average diameter of about 0.2 to about 1.2 microns.

17. A method of forming a defoamer composition, which comprises:
heating a monoester of the formula:

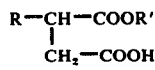

where R is at least one long chain alkenyl group having a total of at least 12 carbon atoms and the formula:

$$R'' - CH = CH - CH_2 -$$

where R" is a linear or primary branched chain alkyl group, and R' is at least one alkyl group containing at least 12 carbon atoms, to a temperature above its melting point and at least 130° C but below the decomposition temperature thereof,
adding water to said heated monoester and agitating the same to cause a rapid volume increase and froth formation and cooling of monoester by at least 20° C, heating the spongy mass with agitation to remove residual water therefrom, and
intimately mixing a silicone oil and an organo-phosphorus compound selected from the group consisting of n-tributyl phosphate, n-tributoxy ethylphosphate and triphenyl phosphite, with the resulting anhydrous mass,
mixing the resulting mixture with at least one surfactant effective to impart water dispersibility to the resulting defoamer composition and agitating the mixture to form an intimately blended mixture, and cooling the intimate blend to ambient temperature,
said monoester, organo-phosphorus compound and silicone oil being used in proportions such that the resulting defoamer composition contains a mixture of active defoamers comprising about 25 to about 60 percent by weight of said monoester, about 15 to about 65% by weight of said organo-phosphorus compound and about 2 to about 20% by weight of said silicone oil.

18. The method of claim 17 including mixing said monoester with a 25% by weight solution of a copolymer of vinyl acetate and fumaric acid which has been esterified with tallow alcohol in a hydrocarbon oil, prior to said heating step, to provide up to about 45% by weight of said mixture of active defoamers of said solution.

19. The method of claim 17 including
mixing with agitation a 25% by weight solution of a copolymer of vinyl acetate and fumaric acid which has been esterified with tallow alcohol in a hydrocarbon oil with a copolymer of ethylene oxide and propylene oxide at a temperature of about 150° C,
said solution being used in an amount up to about 45% by weight of said mixture of active defoamers,
said monoester in molten form is added to the resulting mixture, and mixed therewith and heated to 150° C,
said water is added to the latter mixture to cause the temperature to drop to about 110° C to 120° C and said froth formation caused a 2-fold volume increase,
heating the resulting spongy mass with agitation to a temperature of about 140° C,
maintaining said heated mass at said latter temperature to remove residual water substantially completely,
cooling the latter anhydrous mixture to about 110° C,
adding said silicone oil and organo-phosphorus compound to the cooled mixture,
mixing the latter components together while heating to about 120° C,
cooling the latter mixture to about 100° C,
sequentially adding an ethoxylated hydrogenated tallow amine, an ethoxylated p-nonyl phenol containing about 6 ethylene oxide groups, a calcium petroleum sulfonate having a molecular weight of about 440 and sodium carboxymethylcellulose to said latter cooled mixture,
heating the latter mixture to about 110° C and mixing the components with agitation to blend the same, and
cooling the blend to ambient temperature.

* * * * *